(12) United States Patent
Tamura et al.

(10) Patent No.: US 9,898,133 B2
(45) Date of Patent: Feb. 20, 2018

(54) TOUCHSCREEN

(71) Applicant: Semiconductor Energy Laboratory Co., Ltd., Kanagawa-ken (JP)

(72) Inventors: Hikaru Tamura, Kanagawa (JP); Yoshiyuki Kurokawa, Kanagawa (JP); Jiro Imada, Kanagawa (JP); Toshiki Hamada, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 30 days.

(21) Appl. No.: 13/796,818

(22) Filed: Mar. 12, 2013

(65) Prior Publication Data

US 2013/0257798 A1    Oct. 3, 2013

(30) Foreign Application Priority Data

Mar. 30, 2012 (JP) .................................. 2012-080301

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ...... G06F 3/0412; G06F 3/044; G06F 3/0488; G06F 3/04886; G06F 1/1643; G06F 13/4068; G06F 13/4081; G06F 3/0418
USPC .................................................. 345/173–175
See application file for complete search history.

(56) References Cited

U.S. PATENT DOCUMENTS

| 8,810,543 | B1* | 8/2014 | Kurikawa | G06F 3/0416 |
| | | | | 178/18.06 |
| 8,976,121 | B2 | 3/2015 | Hung et al. | |
| 2009/0251428 | A1* | 10/2009 | Hung | G06F 3/044 |
| | | | | 345/173 |
| 2009/0251437 | A1* | 10/2009 | Hung | G06F 3/044 |
| | | | | 345/174 |
| 2010/0156811 | A1* | 6/2010 | Long | G06F 3/044 |
| | | | | 345/173 |

(Continued)

FOREIGN PATENT DOCUMENTS

| CN | 101763199 A | 6/2010 |
| JP | 06-067802 A | 3/1994 |

(Continued)

OTHER PUBLICATIONS

International Search Report for WO application PCT/JP2013/057336, dated May 28, 2013 (English translation).

(Continued)

*Primary Examiner* — Mihir K Rayan
(74) *Attorney, Agent, or Firm* — Husch Blackwell LLP

(57) ABSTRACT

Malfunction of a large-sized touchscreen is prevented. In particular, malfunction of a large-sized touchscreen is prevented by reduction of wiring delay between a detection region and a controller. In a touchscreen, in which a detection area is divided, including a plurality of detection regions and a plurality of sensors, controllers are provided for the respective divided detection regions, and all the controllers are electrically connected to one central control device. It is preferable that a wiring between each of the divided detection regions and the corresponding controller be shorter than a wiring between the controller and the central control device.

15 Claims, 7 Drawing Sheets

(56) References Cited

U.S. PATENT DOCUMENTS

| | | | |
|---|---|---|---|
| 2010/0165280 A1* | 7/2010 | Ishitani et al. | 349/141 |
| 2011/0090186 A1* | 4/2011 | Yamazaki et al. | 345/204 |
| 2011/0148435 A1* | 6/2011 | Schwartz | G06F 3/0416 |
| | | | 324/658 |
| 2011/0149185 A1 | 6/2011 | Yamazaki | |
| 2011/0304570 A1* | 12/2011 | Maeda et al. | 345/173 |
| 2012/0007818 A1 | 1/2012 | Koga | |
| 2012/0086681 A1* | 4/2012 | Kim et al. | 345/204 |
| 2012/0306811 A1* | 12/2012 | Farmer et al. | 345/174 |

FOREIGN PATENT DOCUMENTS

| | | |
|---|---|---|
| JP | 10-63421 | 3/1998 |
| JP | 2009-252230 A | 10/2009 |
| JP | 2011-086122 A | 4/2011 |
| JP | 2011-145752 | 7/2011 |
| JP | 211-258143 | 12/2011 |
| JP | 2012-008723 A | 1/2012 |
| TW | 201037429 | 10/2010 |
| WO | WO 2011/036492 A2 | 3/2011 |

OTHER PUBLICATIONS

Written Opinion of the International Searching Authority for WO application PCT/JP2013/057336 dated May 28, 2013 (English translation).

Taiwanese Office Action re Application No. TW 102109486, dated Oct. 7, 2016.

Taiwanese Office Action re Application No. TW 106111735, dated Jun. 6, 2017.

* cited by examiner

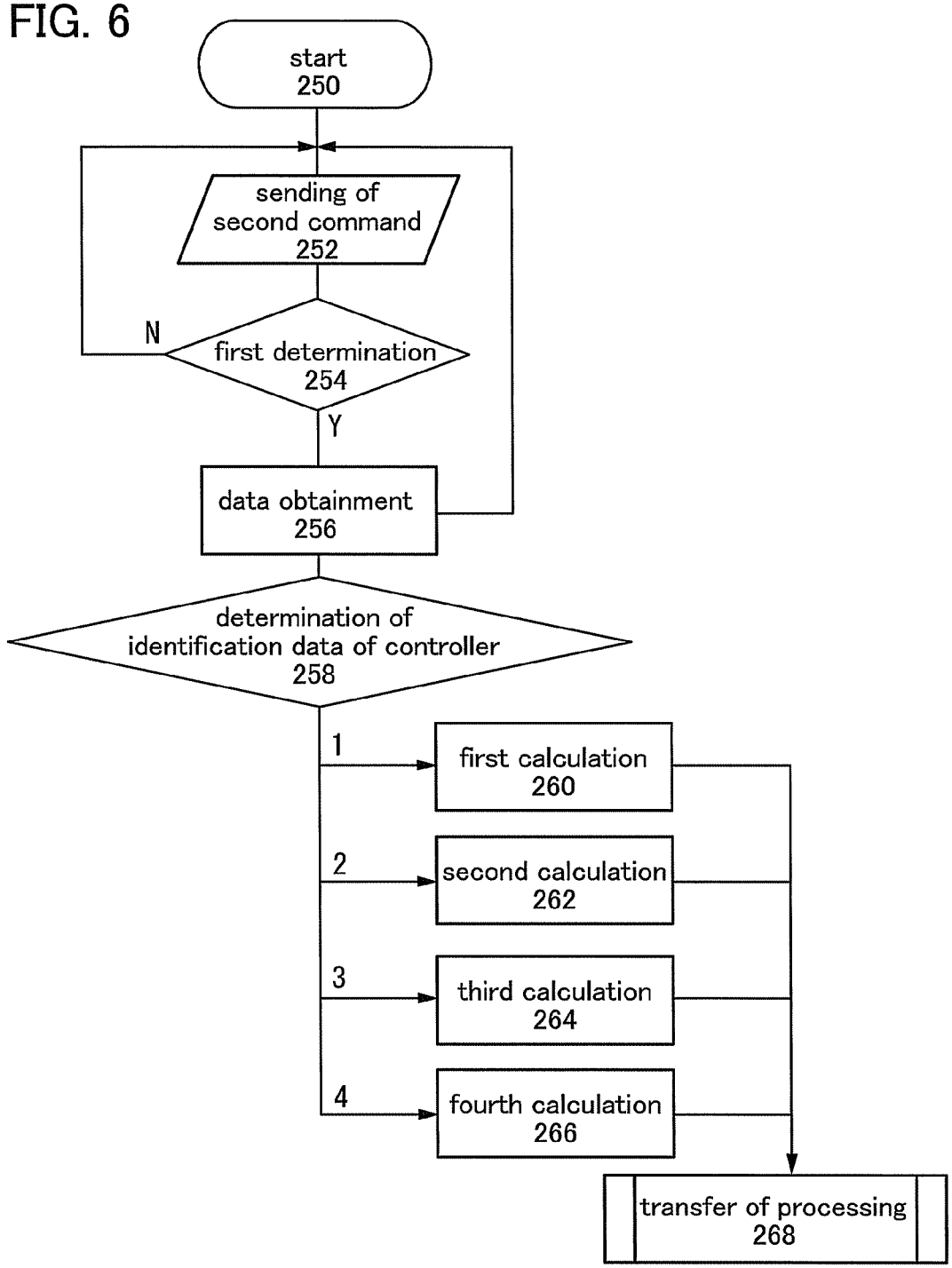

TOUCHSCREEN

TECHNICAL FIELD

The present invention relates to a touchscreen and a driving method thereof.

BACKGROUND ART

In recent years, the size of a display device has been increased. Further, a touchscreen (also referred to as a touch sensor) in which a display device and an input device are combined is widely used. A technique in which a detection region of a touchscreen is divided into four regions is known (e.g., Patent Document 1).

REFERENCE

Patent Document

[Patent Document 1] Japanese Published Patent Application No. 2011-145752

DISCLOSURE OF INVENTION

As in the display device, there is a demand for an increase in the size of a touchscreen. However, unlike in a display device which only displays information, input processing is also performed in the touchscreen; therefore, delay of input data is a problem. The delay of input data triggers malfunction of the touchscreen.

An object of an embodiment of the present invention is to prevent malfunction of a large-sized touchscreen. In particular, a main object is to prevent malfunction of a large-sized touchscreen by reduction of wiring delay between a detection region and a controller.

An embodiment of the present invention is a touchscreen, in which a detection area is divided, including a plurality of detection regions and a plurality of sensors. Controllers are provided for the respective divided detection regions. All the controllers are electrically connected to one central control device.

With the above structure, wiring delay between the detection regions and the controllers can be reduced. Accordingly, malfunction of a large-sized touchscreen can be prevented.

BRIEF DESCRIPTION OF DRAWINGS

In the accompanying drawings:

FIG. 6 shows an example of operation of a touchscreen according to an embodiment of the present invention.

BEST MODE FOR CARRYING OUT THE INVENTION

Hereinafter, an embodiment of the present invention will be described in detail with reference to the accompanying drawings. Note that the present invention is not limited to the following description and it is easily understood by those skilled in the art that the mode and details can be variously changed without departing from the scope and spirit of the present invention. Accordingly, the present invention should not be construed as being limited to the description of the embodiment below.

In this embodiment, a touchscreen of an embodiment of the present invention and operation thereof will be described. Note that in this embodiment, a mode in which a detection region is divided into four regions (quartered) is described as one of the most preferred modes; however, the present invention is not limited thereto. For example, a detection region may be divided into two regions or eight regions.

Figure 1:
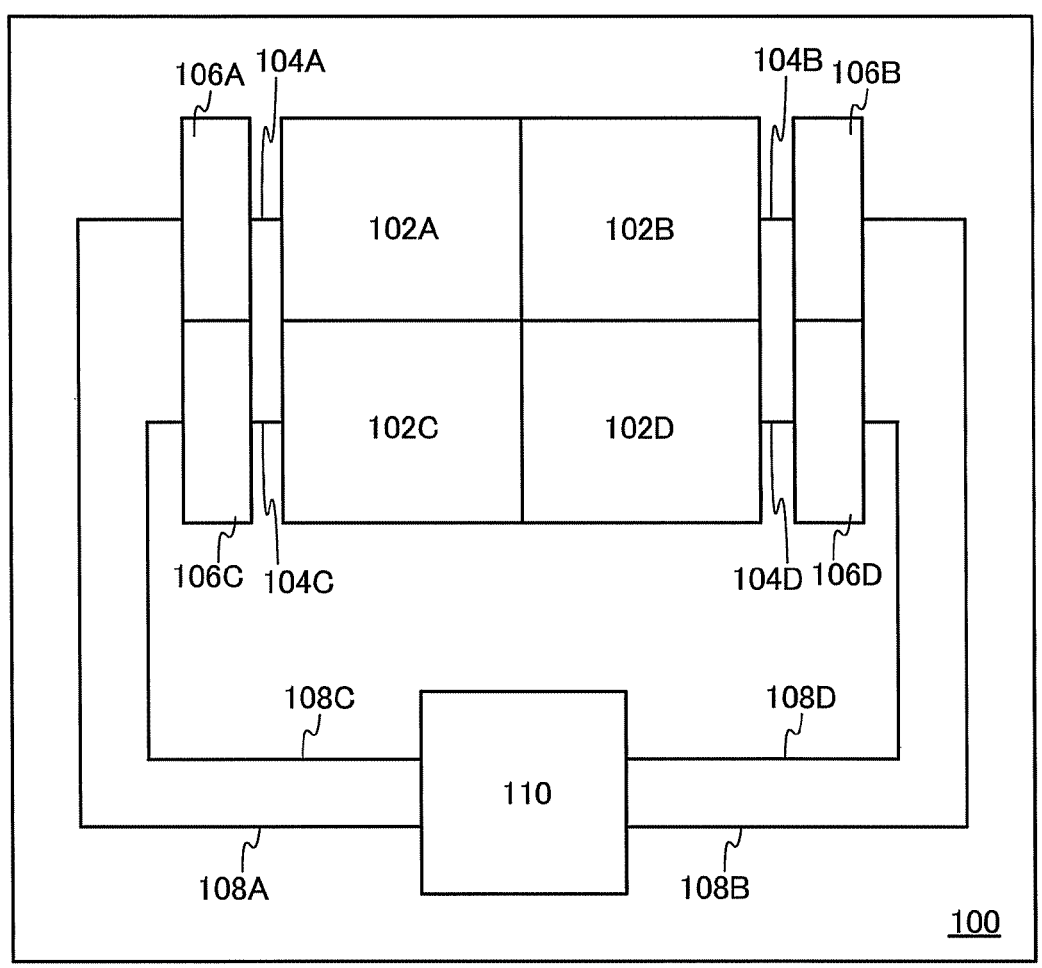
FIG. 1 illustrates an example of a structure of a touchscreen according to an embodiment of the present invention.

FIG. 1 is a schematic diagram illustrating a touchscreen of an embodiment of the present invention. In a touchscreen 100 illustrated in FIG. 1, a touch detection surface (operation surface) is divided into four regions, that is, a first detection region 102A, a second detection region 102B, a third detection region 102C, and a fourth detection region 102D.

The first detection region 102A is electrically connected to a first controller 106A through a first controller connection portion 104A. The second detection region 102B is electrically connected to a second controller 106B through a second controller connection portion 104B. The third detection region 102C is electrically connected to a third controller 106C through a third controller connection portion 104C. The fourth detection region 102D is electrically connected to a fourth controller 106D through a fourth controller connection portion 104D.

The first controller 106A is electrically connected to a central control device 110 through a first central control device connection portion 108A. The second controller 106B is electrically connected to the central control device 110 through a second central control device connection portion 108B. The third controller 106C is electrically connected to the central control device 110 through a third central control device connection portion 108C. The fourth controller 106D is electrically connected to the central control device 110 through a fourth central control device connection portion 108D.

Note that in this specification, in the case where the first detection region 102A, the second detection region 102B, the third detection region 102C, and the fourth detection region 102D do not need to be distinguished from one another, each of them is referred to as a detection region 102.

Similarly, in the case where the first controller connection portion 104A, the second controller connection portion 104B, the third controller connection portion 104C, and the fourth controller connection portion 104D do not need to be distinguished from one another, each of them is referred to as a controller connection portion 104.

Similarly, in the case where the first controller 106A, the second controller 106B, the third controller 106C, and the fourth controller 106D do not need to be distinguished from one another, each of them is referred to as a controller 106.

Similarly, in the case where the first central control device connection portion 108A, the second central control device connection portion 108B, the third central control device connection portion 108C, and the fourth central control device connection portion 108D do not need to be distinguished from one another, each of them is referred to as a central control device connection portion 108.

Figure 2:
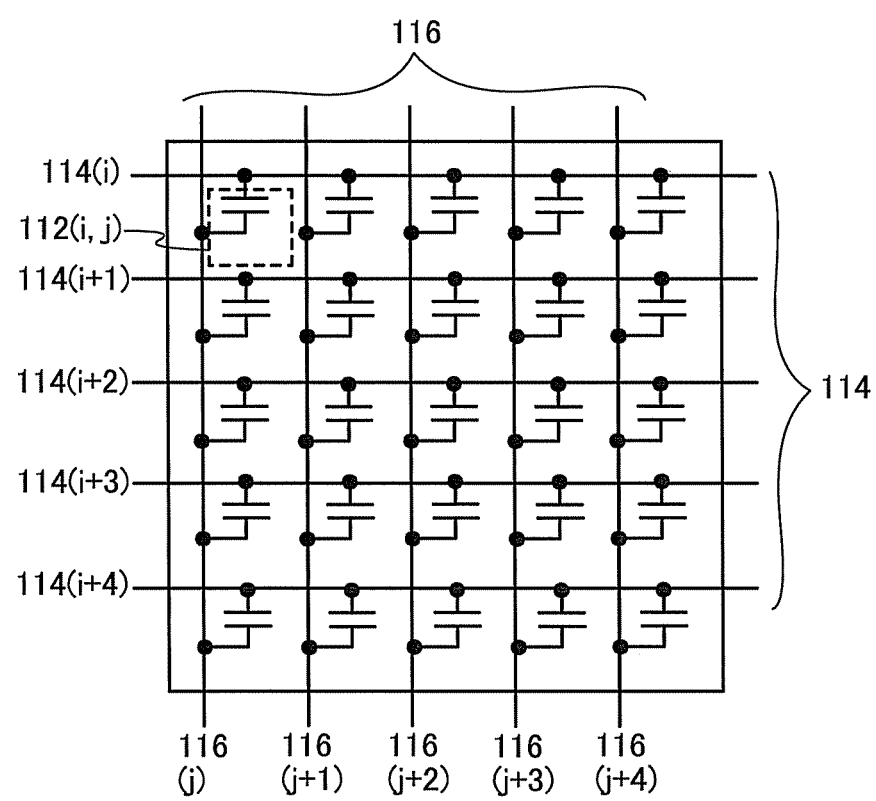
FIG. 2 is a circuit diagram illustrating a structure example of a detection region 102 in FIG. 1.

FIG. 2 illustrates part of the detection region 102 of the touchscreen 100 illustrated in FIG. 1. As illustrated in FIG. 2, in the detection region 102, signal lines 114 and common potential lines 116 are provided to intersect with each other, and a detection pixel 112 is provided at each intersection. A plurality of detection pixels 112 is arranged in a matrix of n rows by m columns (n and m are each a positive integer). Each detection pixel 112 includes a capacitor. Therefore, the touchscreen 100 having the structure illustrated in FIG. 2 is a capacitive touchscreen.

Here, the case where a touch detection position is at a detection pixel $112(i,j)$ is described as an example (i is an integer greater than or equal to 1 and less than or equal to n, and j is an integer greater than or equal to 1 and less than or equal to m). All the common potential lines 116 are kept at a certain potential. Therefore, when the detection pixel $112(i,j)$ at a given position is pressed, capacitance of a capacitor in the detection pixel $112(i,j)$ is changed and a signal is propagated to a signal line $114(i)$; thus, touch is detected. The signal is transmitted to the controller 106.

In the above manner, the touch position can be detected.

Figure 3A:
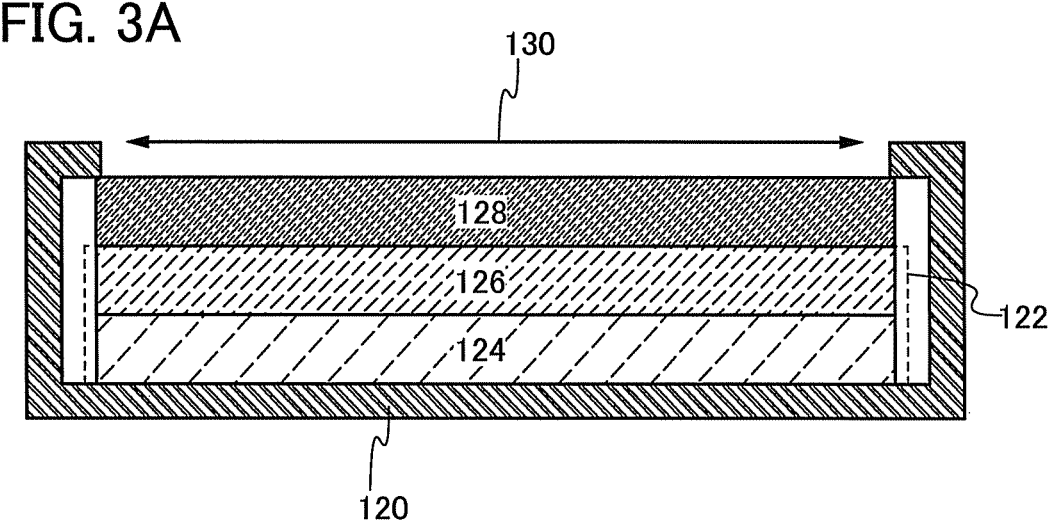
FIGS. 3A and 3B are each a cross-sectional view illustrating a structure example of the detection region 102 in FIG. 1.
Figure 3B:
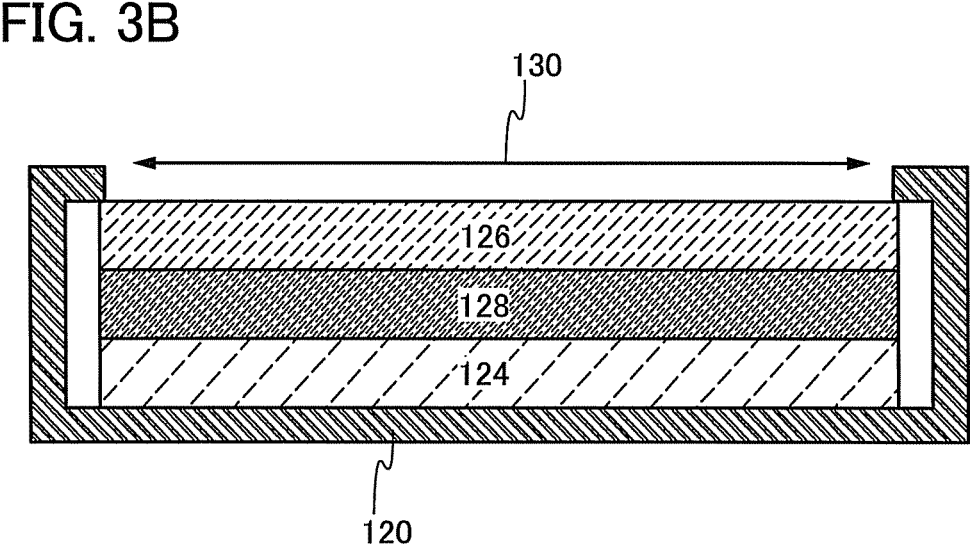

FIGS. 3A and 3B are each a cross-sectional view of the detection region 102.

The detection region 102 illustrated in FIG. 3A includes a display portion 122 and a sensor portion 128 in a housing 120. The display portion 122 includes an element substrate 124 provided with at least a switching element and a pixel electrode, and a counter substrate (sealing substrate) 126 facing the element substrate 124. The sensor portion 128 is provided closer to an operation surface 130 side than the display portion 122.

A black matrix is preferably provided in the display portion 122 for the prevention of color mixing between adjacent pixels. In the case where a black matrix is provided in the display portion 122, the sensor portion 128 is preferably provided closer to the operation surface 130 side than the display portion 122 as mentioned above so that malfunction of the sensor portion 128 caused by the black matrix, or the like can be prevented.

The detection region 102 illustrated in FIG. 3B includes the element substrate 124, the counter substrate (sealing substrate) 126, and the sensor portion 128 in the housing 120. The element substrate 124 is provided with at least a switching element and a pixel electrode. The sensor portion 128 is provided between the element substrate 124 and the counter substrate (sealing substrate) 126.

In the structure illustrated in FIG. 3B, in the case where a black matrix is provided for the counter substrate (sealing substrate) 126 (e.g., on the element substrate 124 side), the sensor portion 128 is preferably provided for the counter substrate (sealing substrate) 126, and is preferably provided closer to the operation surface 130 side than the black matrix. In other words, a structure is preferably employed in which the sensor portion 128 is provided for the counter substrate (sealing substrate) 126, and a black matrix is preferably provided, after the sensor portion 128 is formed, for the counter substrate (sealing substrate) 126 in the manufacturing process.

Figure 4:
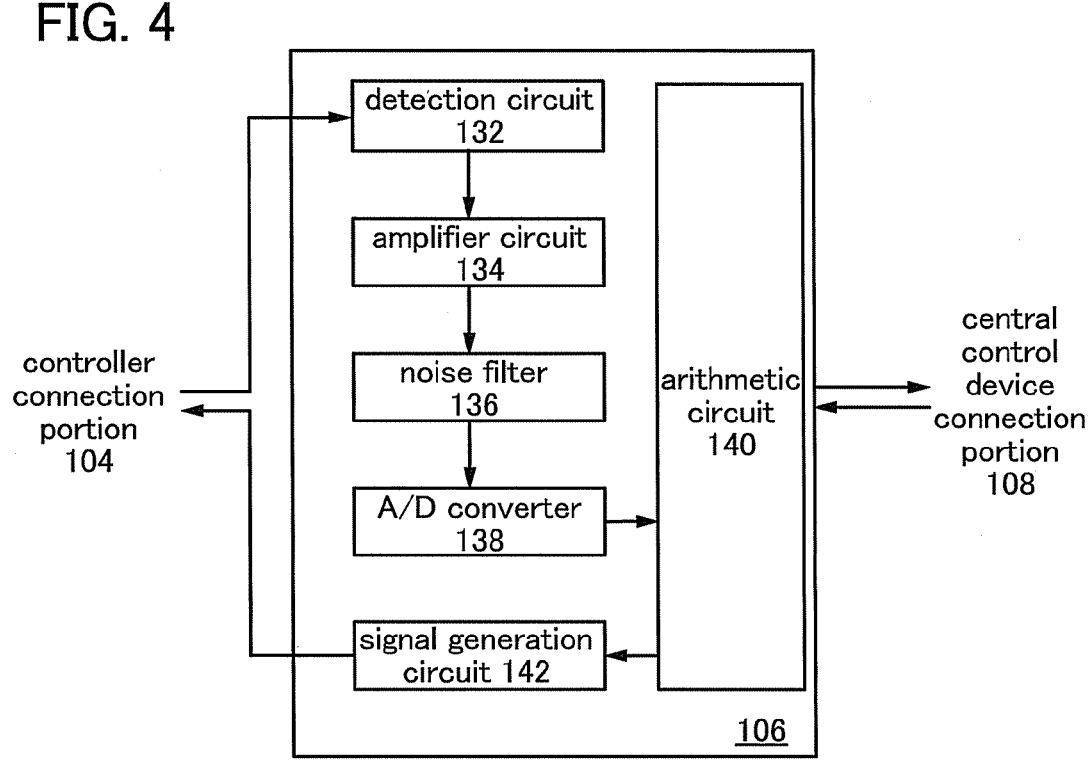
FIG. 4 is a circuit diagram illustrating a structure example of a controller 106 in FIG. 1.

FIG. 4 illustrates a structure example of the controller 106 of the touchscreen 100 illustrated in FIG. 1. As illustrated in FIG. 4, the controller 106 includes a detection circuit 132, an amplifier circuit 134, a noise filter 136, an A/D converter 138, an arithmetic circuit 140, and a signal generation circuit 142. A signal is input to the detection circuit 132 from the controller connection portion 104. The arithmetic circuit 140 outputs a signal to the central control device connection portion 108. The signal generation circuit 142 outputs a signal to the controller connection portion 104.

The detection circuit 132 detects a signal generated by touch detection and supplies the signal to the amplifier circuit 134.

The amplifier circuit 134 amplifies a signal from the detection circuit 132.

The noise filter 136 removes a noise component included in a signal from the amplifier circuit 134.

The A/D converter 138 converts a signal from the noise filter 136, which is an analog signal, into a digital signal.

The arithmetic circuit 140 performs arithmetic processing necessary for detecting touch operation such as obtainment of identification data of the controller 106 and coordinate data, and determination of the identification data. Note that the function of the arithmetic circuit 140 is not limited to arithmetic processing. For example, the arithmetic circuit 140 may control operation other than operation of calculating a detected touch position on the entire panel, to be described later. Further, it is preferable to store data on time when the arithmetic circuit 140 performs arithmetic processing because a problem of deviation of timing or the like does not occur even when signal delay occurs later.

The signal generation circuit 142 generates an appropriate signal in accordance with commands from the arithmetic circuit 140 and the central control device 110 and supplies the signal to the controller connection portion 104.

Note that in this specification, the "length of a wiring between a divided detection region and a corresponding controller" is the length of a wiring between the detection region and the arithmetic circuit 140. The wiring between the detection region and the arithmetic circuit 140 is preferably shorter than a wiring between the controller and the central control device. This is because in the case where the wiring between the detection region and the arithmetic circuit 140 is longer, the signal intensity might be attenuated and the signal itself might be lost in the noise.

Figure 5:
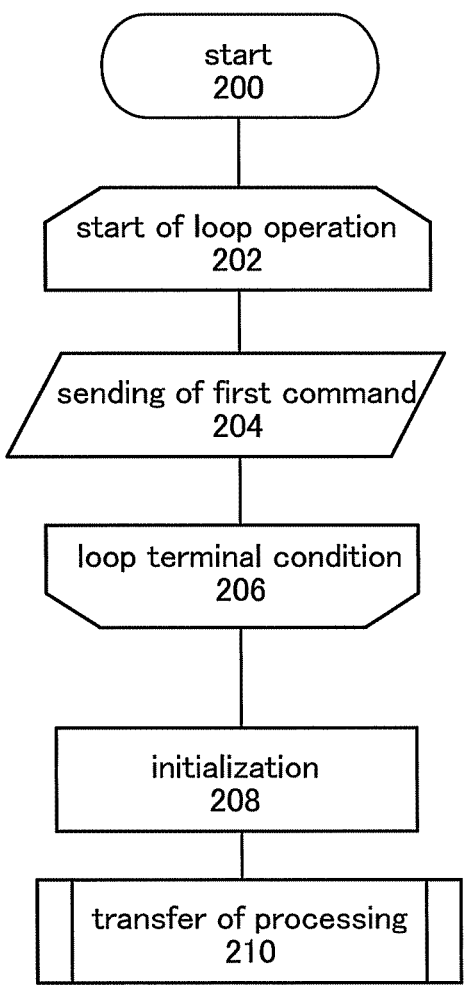
FIG. 5 shows an example of operation of a touchscreen according to an embodiment of the present invention.

Next, operation of the touchscreen 100 illustrated in FIG. 1 will be described with reference to FIG. 5 and FIG. 6. FIG. 5 is a flow chart showing system startup operation and FIG. 6 is a flow chart showing touch detection operation.

First, the touchscreen is started up (start 200). Then, the following loop operation is performed, so that all the controllers are started up (start of loop operation 202). The controllers are started up by a startup command sent to the controllers from the central control device 110 (sending of first command 204). In the case where all the controllers respond to the first command (loop termination condition 206), all the controllers are initialized (initialization 208). In the case where there is a controller not responding, the loop operation is performed until all the controllers respond, that is, the first command is sent to the controllers from the central control device 110. After initialization, the system startup operation is terminated and then processing for detecting touch operation is performed (transfer of processing 210).

First, detection of touch operation is started (start 250). The central control device 110 sends a command (second command) to start detection of touch operation to each of the controllers (sending of second command 252). Next, whether touch operation is detected or not is determined (first determination 254). In the case where the touch operation is detected, identification data of the controller and coordinate data are obtained (data obtainment 256). In the case where touch operation is not detected, the command (second command) to start detection of touch operation is sent again to each of the controllers. In the case where touch operation is detected and identification data of the controller and coordinate data are obtained, first, the identification data of the controller is determined (determination of identification data of controller 258), and the detected touch position on the entire panel is calculated using formulae corresponding to the identification data. Specifically, in the case where the identification data of the controller is 1, the position on the entire panel is calculated using Formula 1 and Formula 2 (first calculation 260). In the case where the identification data of the controller is 2, the position on the entire panel is calculated using Formula 3 and Formula 2 (second calculation 262). In the case where the identification data of the controller is 3, the position on the entire panel is calculated using Formula 1 and Formula 4 (third calculation 264). In the case where the identification data of the controller is 4, the position on the entire panel is calculated using Formula 3 and Formula 4 (fourth calculation 266). In this manner, the touch position on the entire panel can be calculated. After the touch position on the entire panel is calculated, next processing is started (transfer of processing 268).

The touchscreen 100 illustrated in FIG. 1 can operate in the above-described manner.

Here, the calculation formulae used for calculating detected touch positions on the entire panel, which correspond to the identification data, are described. In the following description, the x-coordinate of the detected position in the detection region 102 is $x_0$, the y-coordinate of the detected position in the detection region 102 is $y_0$, the maximum value of the coordinate in the x-axis direction in the detection region 102 is $s_{x\ max}$, the maximum value of the coordinate in the y-axis direction in the detection region 102 is $s_{y\ max}$, the maximum value of the coordinate in the x-axis direction on the entire touchscreen is w, the maximum value of the coordinate in the y-axis direction on the entire touchscreen is h, the number of divisions (the number of detection regions) in the x-axis direction is $x_n$, and the number of divisions (the number of detection regions) in the y-axis direction is $y_n$.

In the case where the identification data of the controller is 1 (i.e., in the case where the detection region 102 is the first detection region 102A), the position (X,Y) on the entire panel is calculated using the following formulae (first calculation 260).

$$X = \left(\frac{x_0}{s_{xmax}}\right)\left(\frac{w}{x_n}\right) \quad \text{[Formula 1]}$$

$$Y = \left(\frac{y_0}{s_{ymax}}\right)\left(\frac{h}{y_n}\right) \quad \text{[Formula 2]}$$

In the case where the identification data of the controller is 2 (i.e., in the case where the detection region 102 is the second detection region 102B), in calculation of the position (X,Y) on the entire panel (second calculation 262), the x-coordinate is calculated using the following formula. Note that the y-coordinate can be calculated using Formula 2 in the first calculation 260, and the formula is not repeated here.

$$X = \left(\frac{x_0}{s_{xmax}}\right)\left(\frac{w}{x_n}\right) + \left(\frac{w}{x_n}\right) \quad \text{[Formula 3]}$$

In the case where the identification data of the controller is 3 (i.e., in the case where the detection region 102 is the third detection region 102C), in calculation of the position (X,Y) on the entire panel (third calculation 264), the y-coordinate is calculated using the following formula. Note that the x-coordinate can be calculated using Formula 1 in the first calculation 260, and the formula is not repeated here.

$$Y = \left(\frac{y_0}{s_{ymax}}\right)\left(\frac{h}{y_n}\right) + \left(\frac{h}{y_n}\right) \quad \text{[Formula 4]}$$

In the case where the identification data of the controller is 4 (i.e., in the case where the detection region 102 is the fourth detection region 102D), in calculation of the position (X,Y) on the entire panel (fourth calculation 266), the x-coordinate is calculated using Formula 3 in the second calculation 262 and the y-coordinate is calculated using Formula 4 in the third calculation 264.

In the above manner, the detected touch position on the entire panel can be calculated.

As described in this embodiment, according to an embodiment of the present invention, wiring delay between a detection region and a controller can be reduced. In the case where such a structure is not employed, for example, a structure in which a wiring is formed thick can be employed; however, formation of a thick wiring leads to an increase in manufacturing cost. Further, a thick wiring in a sensor portion leads to a decrease in transmittance. With the use of an embodiment of the present invention, an increase in cost, a decrease in transmittance, and the like are not caused and a large-sized touchscreen which does not malfunction can be provided.

Figure 7A:
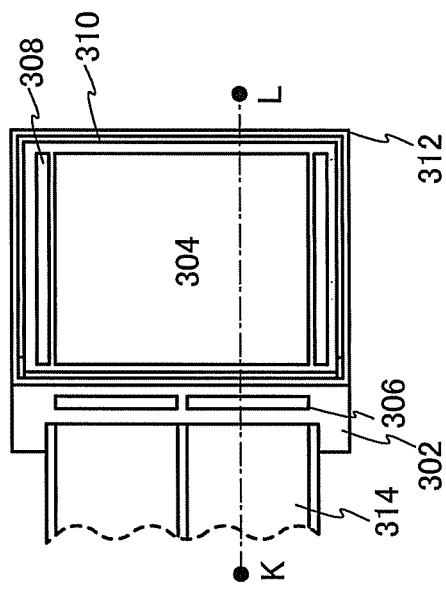
FIGS. 7A and 7B illustrate an example of a display portion of a touchscreen according to an embodiment of the present invention.
Figure 7B:
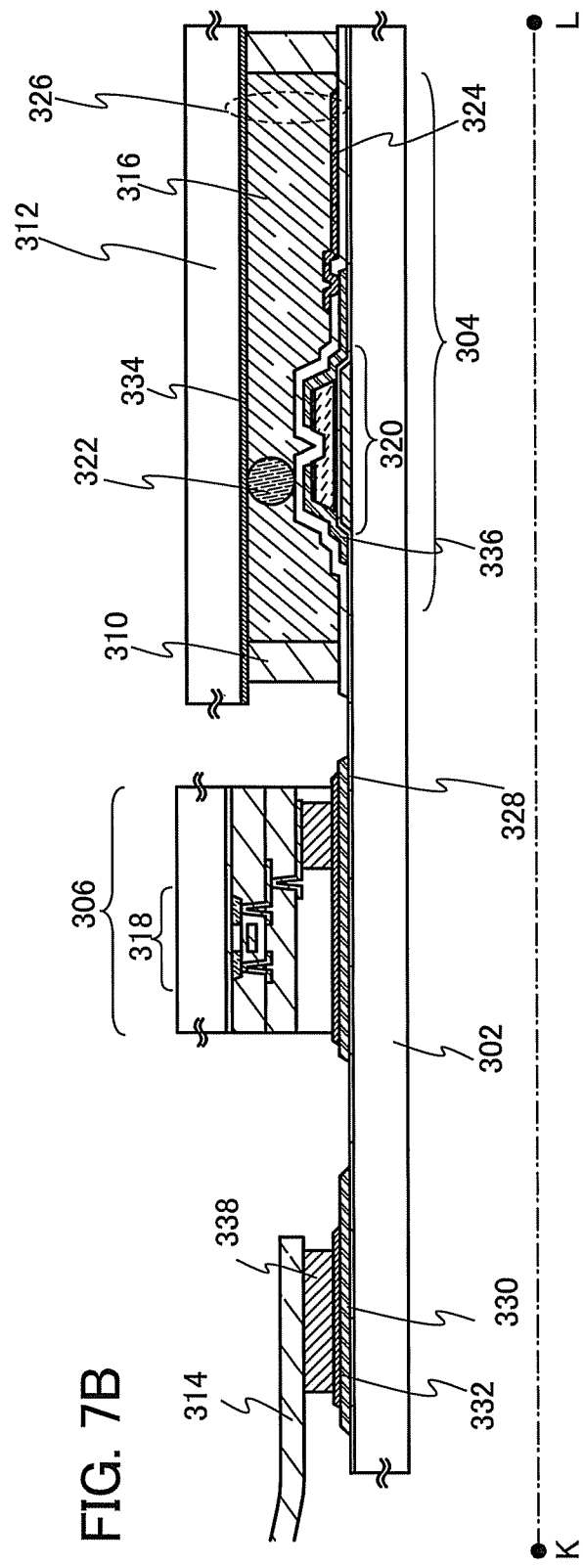

Next, a liquid crystal display device will be described with reference to FIGS. 7A and 7B as an example of a display device corresponding to a display portion of the touchscreen according to an embodiment of the present invention. FIG. 7A is a top view of a liquid crystal display device in which a thin film transistor 320 and a liquid crystal element 326 formed over a first substrate 302 are sealed with a sealant 310 provided between the first substrate 302 and the second substrate 312. FIG. 7B is a cross-sectional view taken along line K-L in FIG. 7A.

In FIGS. 7A and 7B, the sealant 310 is provided to surround a pixel portion 304 and a scan line driver circuit 308 formed over the first substrate 302. The second substrate 312 is provided over the pixel portion 304 and the scan line driver circuit 308. Therefore, together with a liquid crystal layer 316, the pixel portion 304 and the scan line driver circuit 308 are sealed by the first substrate 302, the sealant 310, and the second substrate 312. Further, a signal line driver circuit 306 is mounted on a region other than the region surrounded by the sealant 310 over the first substrate 302. Note that the signal line driver circuit 306 is formed with a thin film transistor formed over a separately prepared substrate but is not limited thereto. The case where the signal line driver circuit 306 including a thin film transistor is attached to the first substrate 302 is described in this embodiment. It is preferable that the signal line driver circuit include a thin film transistor using a crystalline semiconductor layer such as a single crystal semiconductor layer and be attached to the first substrate 302. FIG. 7B illustrates a thin film transistor 318 which is formed using a crystalline semiconductor layer and included in the signal line driver circuit 306.

The pixel portion 304 provided over the first substrate 302 includes a plurality of thin film transistors, and in FIG. 7B, the thin film transistor 320 included in the pixel portion 304 is illustrated. In addition, the signal line driver circuit 306 also includes a plurality of thin film transistors, and in FIG. 7B, the thin film transistor 318 included in the signal line driver circuit 306 is illustrated.

A pixel electrode 324 included in the liquid crystal element 326 is electrically connected to the thin film transistor 320 through a wiring 336. A counter electrode 334 of the liquid crystal element 326 is formed on the second substrate 312. A portion where the pixel electrode 324, the counter electrode 334, and the liquid crystal layer 316 overlap with one another is the liquid crystal element 326.

The first substrate 302 and the second substrate 312 can each be formed using glass, plastics, or the like. As plastics, a fiber-reinforced plastic (FRP) plate, a polyester film, an acrylic resin film, or the like can be used.

A spacer 322 is a bead spacer, and is provided to control a distance (cell gap) between the pixel electrode 324 and the counter electrode 334. Note that a spacer (post spacer) which is obtained by selectively etching an insulating layer may also be used.

A variety of signals (potentials) supplied to the signal line driver circuit 306 which is formed separately, the scan line driver circuit 308, and the pixel portion 304 are supplied from a flexible printed circuit (FPC) 314 through a lead wiring 328 and a lead wiring 330.

In FIGS. 7A and 7B, a connection terminal 332 is formed using the same conductive layer as the pixel electrode 324 included in the liquid crystal element 326. The lead wiring 328 and the lead wiring 330 are formed using the same conductive layer as the wiring 336. However, this embodiment is not limited to this.

The connection terminal 332 is electrically connected to a terminal included in the FPC 314 through an anisotropic conductive layer 338.

Although not illustrated, the liquid crystal display device described in this embodiment includes an alignment film and a polarizing plate, and may also include a color filter, a light-blocking layer, or the like.

Note that the structures of the transistors included in the liquid crystal display device are not limited to the ones illustrated in FIGS. 7A and 7B, and any structure may be employed.

An EL display device may be used for the display portion instead of the liquid crystal display device. In this case, metal (typically stainless steel), ceramics, or a sheet in which aluminum foil is sandwiched between polyester films, or the like may be used for one of the first substrate 302 and the second substrate 312.

The display portion of the touchscreen according to an embodiment of the present invention has the above-described structure.

Note that a touchscreen module having the above structure is also an embodiment of the present invention. Here, a module refers to a component which can be mounted on an end product. Accordingly, a touchscreen module is a component which can be mounted on a touchscreen. The touchscreen module is not limited only to a component used for a touchscreen; a component which is probably used as a component of a touchscreen is also included in a technical scope of an embodiment of the present invention.

REFERENCE NUMERALS

100: touchscreen, 102: detection region, 102A: first detection region, 102B: second detection region, 102C: third detection region, 102D: fourth detection region, 104: controller connection portion, 104A: first controller connection portion, 104B: second controller connection portion, 104C: third controller connection portion, 104D: fourth controller connection portion, 106: controller, 106A: first controller, 106B: second controller, 106C: third controller, 106D: fourth controller, 108: central control device connection portion, 108A: first central control device connection portion, 108B: second central control device connection portion, 108C: third central control device connection portion, 108D: fourth central control device connection portion, 110: central control device, 112: detection pixel, 114: signal line, 116: common potential line, 120: housing, 122: display portion, 124: element substrate, 126: counter substrate (sealing substrate), 128: sensor portion, 130: operation surface, 132: detection circuit, 134: amplifier circuit, 136: noise filter, 138: A/D converter, 140: arithmetic circuit, 142: signal generation circuit, 200: start, 202: start of loop operation, 204: sending of first command, 206: loop terminal condition, 208: initialization, 210: transfer of processing, 250: start, 252: sending of second command, 254: first determination, 256: data obtainment, 258: determination of identification data of controller, 260: first calculation, 262: second calculation, 264: third calculation, 266: fourth calculation, 268: transfer of processing, 302: substrate, 304: pixel portion, 306: signal line driver circuit, 308: scan line driver circuit, 310: sealant, 312: substrate, 314: FPC, 316: liquid crystal layer, 318: thin film transistor, 320: thin film transistor, 322: spacer, 324: pixel electrode, 326: liquid crystal element, 328: wiring, 330: wiring, 332: connection terminal, 334: counter electrode, 336: wiring, and 338: anisotropic conductive layer.

This application is based on Japanese Patent Application serial no. 2012-080301 filed with Japan Patent Office on Mar. 30, 2012, the entire contents of which are hereby incorporated by reference.

The invention claimed is:

1. A touchscreen comprising:
   a first detection region and a second detection region;
   a first controller and a second controller; and
   a central control device,
   wherein the first detection region is adjacent to the second detection region,
   wherein the first detection region is electrically connected to the first controller,
   wherein the second detection region is electrically connected to the second controller,
   wherein the first controller and the second controller are electrically connected to the central control device,
   wherein the first controller is provided on one side of the first detection region and the second detection region,
   wherein the second controller is provided on the other side of the first detection region and the second detection region,
   wherein the first detection region is provided between the first controller and the second controller,
   wherein each of the first controller and the second controller is configured to obtain an identification data of one of the first controller and the second controller corresponding to a detected touch position and a coordinate data corresponding to the detected touch position in one of the first detection region and the second detection region and to calculate the detected touch position on the entire touchscreen by using the identification data and the coordinate data, wherein the first controller is configured to obtain x-coordinate data and y-coordinate data of the detected touch position in the first detection region, wherein the second controller is configured to obtain x-coordinate data and y-coordinate data of the detected touch position in the second detection region, wherein each of a first wiring between the first detection region and a first arithmetic circuit of the first controller and a second wiring between the second detection region and a second arithmetic circuit of the second controller is shorter than each of a third wiring between the first controller and the central control device and a fourth wiring between the second detection region and the central control device, and wherein data regarding time is stored, the time being when the first arithmetic circuit performs arithmetic processing.

2. The touchscreen according to claim 1,
wherein the touchscreen includes a plurality of sensors in each of the first detection region and the second detection region, and
wherein the touchscreen is a capacitive touchscreen in which a capacitor is provided for each of the plurality of sensors.

3. The touchscreen according to claim 1, further comprising a third controller and a fourth controller,
wherein the third controller is adjacent to the first controller, and
wherein the fourth controller is adjacent to the second controller.

4. A display device comprising the touchscreen according to claim 1.

5. The touchscreen according to claim 1,
wherein, before obtaining the identification data of the controller and the coordinate data, each of the first controller and the second controller is initialized.

6. The touchscreen according to claim 1,
wherein the first controller and the second controller are the same.

7. A touchscreen comprising:
a first detection region and a second detection region;
a first controller and a second controller;
a central control device; and
an EL display device,
wherein the first detection region is adjacent to the second detection region,
wherein each of the first detection region and the second detection region comprises:
a first substrate;
a switching element over the first substrate;
a pixel electrode over the first substrate; and
a sensor portion over the first substrate,
wherein the first detection region is electrically connected to the first controller,
wherein the second detection region is electrically connected to the second controller,
wherein the first controller and the second controller are electrically connected to the central control device, wherein the first controller is provided on one side of the first detection region and the second detection region,
wherein the second controller is provided on the other side of the first detection region and the second detection region,
wherein the first detection region is provided between the first controller and the second controller,
wherein each of the first controller and the second controller is configured to obtain an identification data of one of the first controller and the second controller corresponding to a detected touch position and a coordinate data corresponding to the detected touch position in one of the first detection region and the second detection region and to calculate the detected touch position on the entire touchscreen by using the identification data and the coordinate data,
wherein the first controller is configured to obtain x-coordinate data and y-coordinate data of the detected touch position in the first detection region,
wherein the second controller is configured to obtain x-coordinate data and y-coordinate data of the detected touch position in the second detection region,
wherein each of a first wiring between each of the first detection region and a first arithmetic circuit of the first controller and a second wiring between the second detection region and a second arithmetic circuit of the second controller is shorter than each of a third wiring between the first controller and the central control device and a fourth wiring between the second detection region and the central control device, and
wherein data regarding time is stored, the time being when the first arithmetic circuit performs arithmetic processing.

8. The touchscreen according to claim 7, wherein the touchscreen is a capacitive touchscreen in which a capacitor is provided for the sensor portion.

9. The touchscreen according to claim 7, further comprising a second substrate between the first substrate and the sensor portion.

10. The touchscreen according to claim 7, further comprising a second substrate over the sensor portion.

11. The touchscreen according to claim 7, further comprising a black matrix over the first substrate.

12. The touchscreen according to claim 7, further comprising a third controller and a fourth controller,
wherein the third controller is adjacent to the first controller, and
wherein the fourth controller is adjacent to the second controller.

13. A display device comprising the touchscreen according to claim 7.

14. The touchscreen according to claim 7,
wherein, before obtaining the identification data of the controller and the coordinate data, each of the first controller and the second controller is initialized.

15. The touchscreen according to claim 7,
wherein the first controller and the second controller are the same.

* * * * *